(12) United States Patent
Tracht et al.

(10) Patent No.: US 7,328,912 B2
(45) Date of Patent: *Feb. 12, 2008

(54) VEHICLE SEAT ASSEMBLY

(75) Inventors: Michael L. Tracht, Ingolstadt (DE); Rainer Penzel, Munich (DE); Mathias Klemm, Grobenzell (DE); Richard G. Dierl, Sandersdoft (DE)

(73) Assignee: Lear Corporation, Southfield, MI (US)

( * ) Notice: Subject to any disclaimer, the term of this patent is extended or adjusted under 35 U.S.C. 154(b) by 400 days.

This patent is subject to a terminal disclaimer.

(21) Appl. No.: 10/904,829

(22) Filed: Dec. 1, 2004

(65) Prior Publication Data

US 2006/0113751 A1   Jun. 1, 2006

(51) Int. Cl.
*B60R 21/16* (2006.01)

(52) U.S. Cl. .................. 280/730.2; 280/743.1

(58) Field of Classification Search ............ 280/730.2, 280/728.3, 728.2, 743.1
See application file for complete search history.

(56) References Cited

U.S. PATENT DOCUMENTS

| | | | |
|---|---|---|---|
| 5,498,030 A | 3/1996 | Hill et al. | |
| 5,542,691 A * | 8/1996 | Marjanski et al. | 280/728.2 |
| 5,678,853 A | 10/1997 | Maly | |
| 5,749,597 A | 5/1998 | Saderholm | |
| 5,762,363 A | 6/1998 | Brown et al. | |
| 5,816,610 A | 10/1998 | Higashiura et al. | |
| 5,860,673 A | 1/1999 | Hasegawa et al. | |
| 5,863,063 A | 1/1999 | Harrell | |
| 5,899,528 A | 5/1999 | Rumpf et al. | |
| 5,927,749 A | 7/1999 | Homier et al. | |
| 5,938,232 A | 8/1999 | Kalandek et al. | |
| 5,967,603 A | 10/1999 | Genders et al. | |
| 6,045,151 A | 4/2000 | Wu | |
| 6,045,182 A * | 4/2000 | Chevallier et al. | 297/216.13 |
| 6,234,518 B1 * | 5/2001 | Ryl et al. | 280/730.2 |
| 6,237,934 B1 | 5/2001 | Harrell et al. | |
| 6,588,838 B1 | 7/2003 | Dick, Jr. et al. | |
| 2002/0024198 A1 * | 2/2002 | Umezawa et al. | 280/728.2 |
| 2002/0063452 A1 * | 5/2002 | Harada et al. | 297/216.13 |

FOREIGN PATENT DOCUMENTS

| | | | |
|---|---|---|---|
| DE | 4313813 A1 | * | 11/1994 |
| DE | 20201439 U | * | 1/2002 |
| DE | 10120118 A1 | * | 11/2002 |
| FR | 2 806 685 A1 | | 9/2001 |

* cited by examiner

*Primary Examiner*—Paul N. Dickson
*Assistant Examiner*—Tiffany L. Webb
(74) *Attorney, Agent, or Firm*—Brooks Kushman P.C.

(57) ABSTRACT

A vehicle seat assembly including a frame, a cushion associated with the frame, an air bag module, and a trim cover disposed proximate the cushion and having an end portion. A coupling member is disposed proximate the end portion. The coupling member engages the air bag module to secure the trim cover.

20 Claims, 3 Drawing Sheets

VEHICLE SEAT ASSEMBLY

BACKGROUND OF THE INVENTION

1. Field of the Invention

The present invention relates to a vehicle seat assembly, and more particularly to a seat assembly having a coupling member for securing a trim cover.

2. Background Art

Vehicle seat assemblies may include a trim cover disposed on a foam cushion. Previously, trim covers were attached to the foam cushion by stitching, adhesives, or staples. Such permanent attachment methods made removal, repositioning, and replacement of a trim cover impractical.

SUMMARY OF THE INVENTION

According to one aspect of the present invention, a vehicle seat assembly is provided. The vehicle seat assembly includes a cushion assembly, a first coupling member, and an air bag module. The cushion assembly has a frame, a cushion associated with the frame, and a trim cover disposed proximate the cushion. The trim cover has an end portion. The first coupling member is disposed proximate the end portion. The air bag module is disposed proximate the frame. The air bag module has a second coupling member adapted to engage the first coupling member.

The first and second coupling members may have male or female configurations. The first and/or second coupling members may have one or more protrusions that facilitate engagement.

The first coupling member may include an end surface and a protrusion disposed proximate the end surface. The second coupling member may include an arm extending from the air bag module. The arm may have an aperture configured to receive the protrusion.

According to another aspect of the present invention, a vehicle seat assembly is provided. The vehicle seat assembly includes a seat back, an air bag module, and a coupling member. The seat back has a frame, a cushion disposed proximate the frame, and a trim cover disposed proximate the cushion. The trim cover has an end portion. The air bag module is disposed proximate the frame and has a housing that includes a slot. The slot receives the coupling member to secure the trim cover to the air bag module.

The air bag module may include an air bag. The housing may have first and second walls spaced apart from each other. The first and second walls may cooperate to define the slot. The first wall may be disposed proximate the air bag. The second wall may be spaced apart from the air bag when the air bag is deflated. The first and second walls may be connected by a connecting wall. The connecting and second walls may be integrally formed with the first wall. The connecting and second walls may have a generally L-shaped configuration.

The coupling member may include one or more protrusions adapted to engage the first, second, and/or connecting walls. The first, second, and/or connecting walls may have one or more apertures adapted to receive one or more protrusions disposed on the coupling member.

According to another aspect of the present invention, a vehicle seat assembly is provided. The vehicle seat assembly includes a seat back, an air bag module, and a coupling member. The seat back has a frame, a cushion, and a trim cover. The cushion is connected to the frame. The trim cover is disposed proximate the cushion and has an end portion. The air bag module is disposed proximate the frame and has a housing and an air bag. The air bag is disposed in the housing when the air bag is deflated. The housing includes first and second walls. The first wall is disposed proximate the air bag. The second wall is disposed adjacent to the cushion. The first and second walls cooperate to define a slot. The coupling member is attached to the end portion. The coupling member is at least partially disposed in the slot and contacts the first and second walls to couple the trim cover to the air bag module.

DETAILED DESCRIPTION OF THE EMBODIMENT(S)

Figure 1:
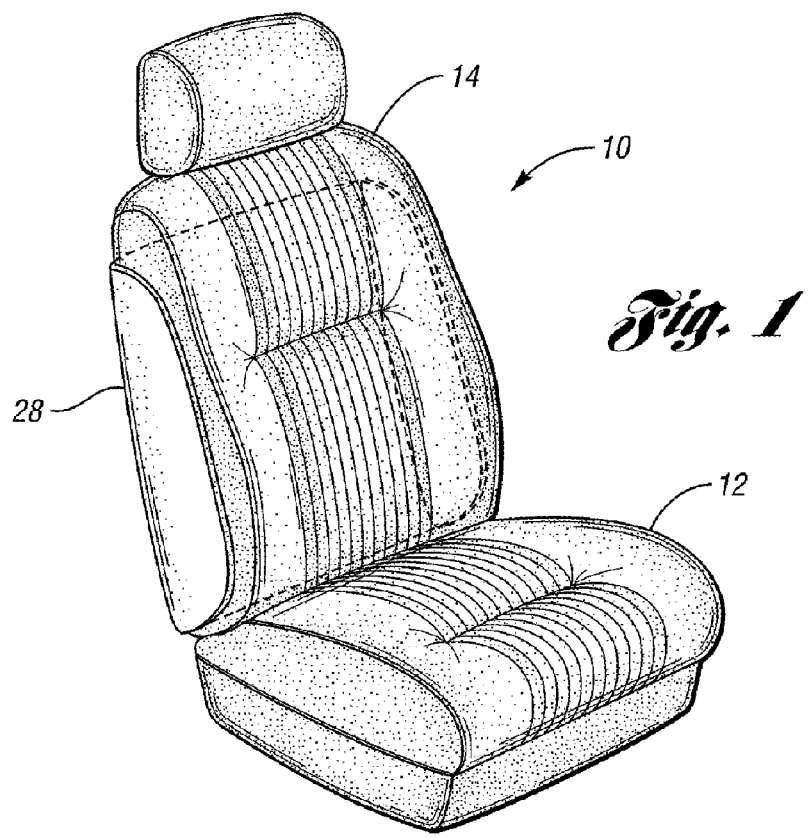
FIG. 1 is a perspective view of a vehicle seat.

Referring to FIG. 1, a seat assembly 10 for a motor vehicle is shown. The seat assembly includes a seat bottom 12 and a seat back 14. The seat bottom 12 is adapted to be mounted on the vehicle. The seat back 14 is disposed proximate the seat bottom 12 and may be adapted to pivot with respect to the seat bottom 12.

Figure 2:
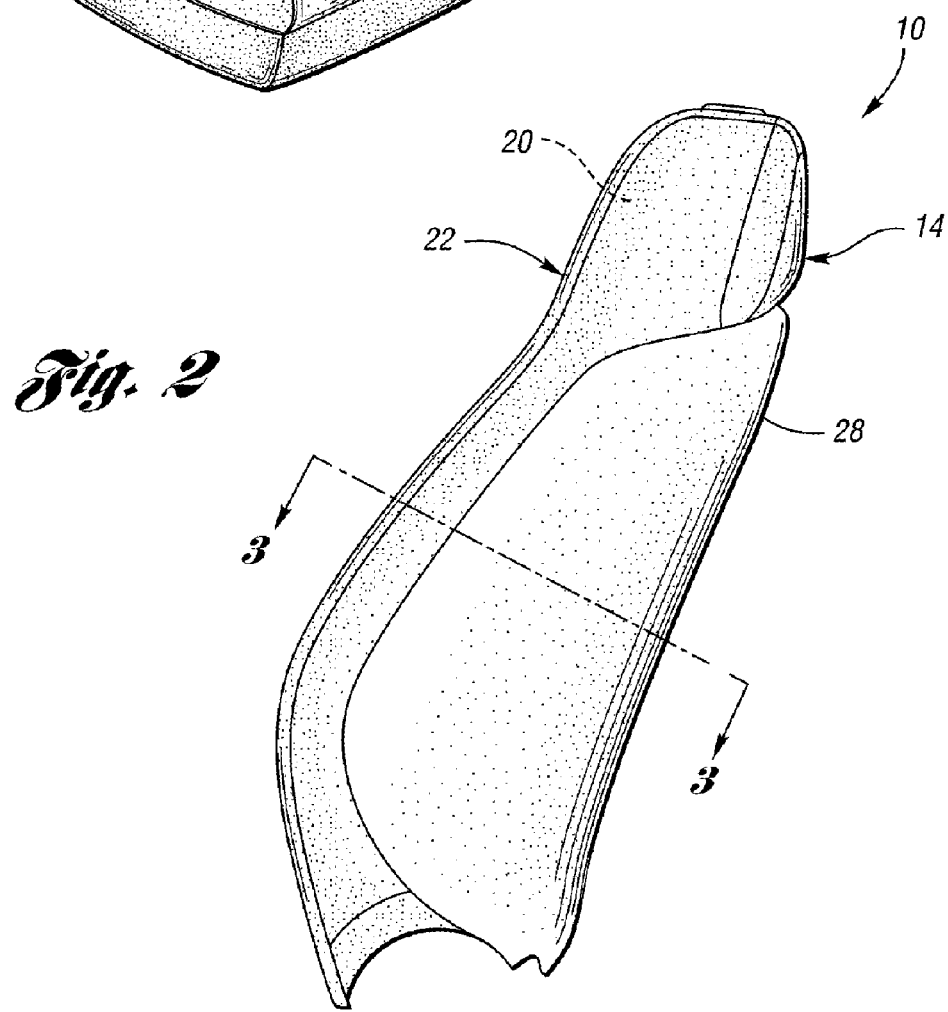
FIG. 2 is a side view of a portion of the vehicle seat assembly.
Figure 3:
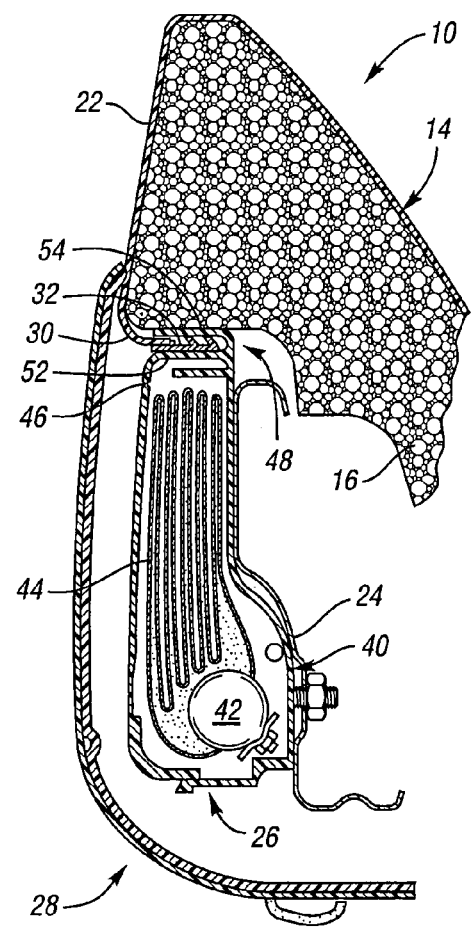
FIG. 3 is a fragmentary section view of one embodiment of the vehicle seat assembly taken through line 3-3.

Referring to FIGS. 2 and 3, the seat back 14 is shown in more detail. In the embodiment shown, the seat back 14 includes a seat pad or cushion 20, a trim cover 22, a frame 24, an air bag module 26, and a back panel 28.

The cushion 20 may have any suitable configuration and may be made of any suitable material, such as molded polymeric material like polyurethane foam. In the embodiment shown, the cushion 20 is disposed proximate the frame 24 and may be attached to the frame 24 at various locations.

The trim cover 22 is configured to form an exterior surface of the seat assembly 10. The trim cover 22 may be made of any suitable material, such as fabric, vinyl, and/or leather. The trim cover may be disposed proximate one or more surfaces of the cushion 20. In addition, the trim cover 22 may be attached to the cushion 20 in any suitable manner, such as with an adhesive, stitching, or fastener. In the embodiment shown, the trim cover 22 includes an end portion 30 that is detached from the cushion 20.

A first coupling member 32 is disposed proximate the end portion 30. The first coupling member 32 may be attached to the end portion 30 in any suitable manner, such as with a fastener, adhesive, sonic or ultrasonic welding, or heat staking. The first coupling member 32 may have any suitable configuration. For example, the first coupling member 32 may have a male or a female configuration, or combinations thereof. The first coupling member 32 is configured to facilitate attachment of the trim cover 22 to the seat assembly 10 as will be described in greater detail below.

The first coupling member 32 may be made of any suitable material or materials, such as a metal or a polymeric material like polypropylene. In addition, the first coupling member 32 may include one or more protrusions 34 that extend from one or more surfaces of the first coupling member 32. The body and protrusions of the first coupling member 32 may be made of different materials. For example, the first coupling member 32 may include a metal body and polymeric protrusions or vice versa. In addition, a plurality of first coupling members 32 may be employed.

The frame 24 may have any suitable configuration and may be made of any suitable material, such as a polymeric material or metal. The frame 24 provides a support structure for the seat back 14.

The air bag module 26 includes a housing 40, an inflator 42, and an air bag 44. The air bag module 26 may be disposed in any suitable location. In the embodiment shown in FIG. 3, the air bag module 26 is disposed proximate the frame 24.

The housing 40 is configured to receive at least a portion of the air bag 44 when the air bag 44 is deflated. The housing 40 may have any suitable configuration. In the embodiment shown, the housing 40 includes an optional frangible portion 46 that is adapted to tear or sever in response to force exerted by the air bag 44 when the air bag 44 is inflated. The housing 40 may be configured to receive the inflator 42 and the air bag 44. The housing 40 also includes a second coupling member 48 configured to engage the first coupling member 32.

The second coupling member 48 may have any suitable configuration that is compatible with the first coupling member 32. For example, the second coupling member 48 may have a male or a female configuration, or combinations thereof. Optionally, the second coupling member may include one or more protrusions. The second coupling member 48 may be integrally formed with the housing 40.

The air bag 44 is configured to expand from a stored condition to a deployed or inflated condition when the inflation gas is provided. More specifically, the air bag 44 is deflated and concealed by the housing 40 and/or back panel 28 when in the stored condition and is inflated and positioned between a seat occupant and an interior vehicle surface when in the inflated condition. The second coupling member 48 may be positioned so as not to interfere with air bag deployment.

The back panel 28 may have any suitable configuration. For example, the back panel 28 may wrap around the back and one or more sides of the seat back 14. The back panel 28 is configured to conceal the air bag module 26 prior to air bag deployment and to permit deployment of the air bag 44. The back panel 28 may be attached to the seat assembly 10 in any suitable manner, such as with hooks, fasteners, and/or an adhesive.

Referring to FIGS. 4A-4F, various exemplary embodiments of first and second coupling members are shown. In the embodiments shown in FIG. 4A-4E, the first coupling member has a male configuration and the second coupling member has a female configuration. In the embodiment shown in FIG. 4F, the first coupling member has a female configuration and the second coupling member has a male configuration.

Figure 4A:
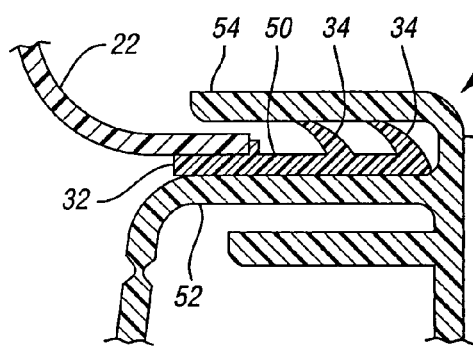
FIGS. 4A-4F are fragmentary section views of exemplary embodiments of a coupling member for attaching a trim cover to the vehicle seat assembly.
Figure 4B:
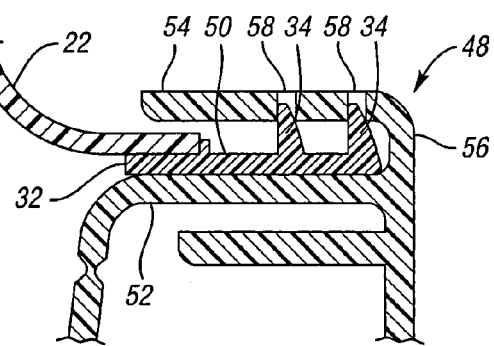

FIG. 4A is a magnified view of the first and second coupling members 32,48 shown in FIG. 3. In FIG. 4A, the first coupling member 32 includes protrusions 34 that extend from a first surface 50. The second coupling member 48 is configured as a slot and includes first and second walls 52,54 that are spaced apart and connected by a connecting wall 56. The protrusions 34 extend toward and engage the first wall 52 to help secure the first and second coupling members 32,48. In addition, the protrusions 34 may be received in one or more apertures 58 as shown in FIG. 4B.

Figure 4C:
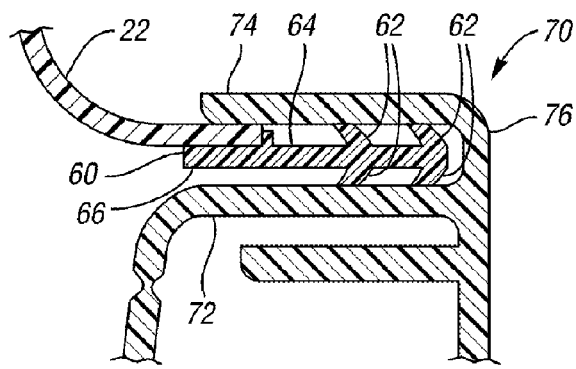
Figure 4D:
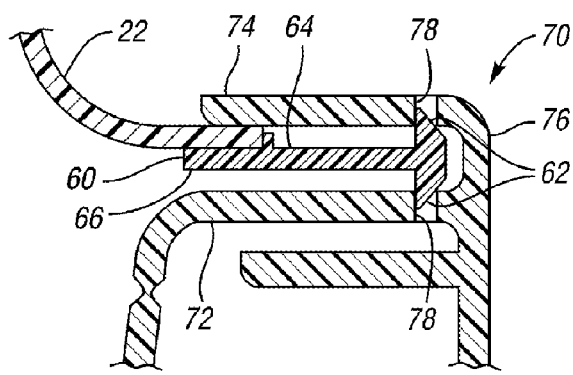

In FIG. 4C, a first coupling member 60 is shown having protrusions 62 that extend from first and second surfaces 64,66. The second coupling member 70 is configured as a slot and includes first and second walls 72,74 that are spaced apart from each other and connected by a connecting wall 76. The protrusions 62 disposed on the first and second surfaces 64,66 extend toward and engage the first and second walls 72,74, respectively. In addition, the protrusions 62 may be received in one or more apertures 78 as shown in FIG. 4D.

Figure 4E:
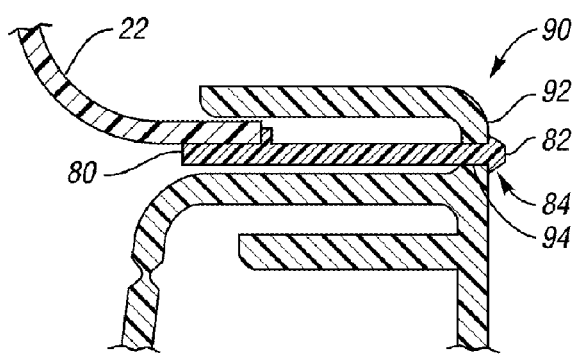

In FIG. 4E, a first coupling member 80 includes a protrusion 82 disposed proximate an end surface 84. The second coupling member 90 includes a wall 92 extending from the housing. The wall 92 includes an aperture 94 that is adapted to receive the protrusion 82. More specifically, the protrusion 82 may be inserted through the aperture 94 such that the protrusion 82 inhibits the first coupling member 80 from disengaging the second coupling member 90. The protrusion 82 may have any suitable configuration and may be adapted to flex or compress to permit the protrusion 82 to be inserted into and/or through the aperture 94.

Figure 4F:
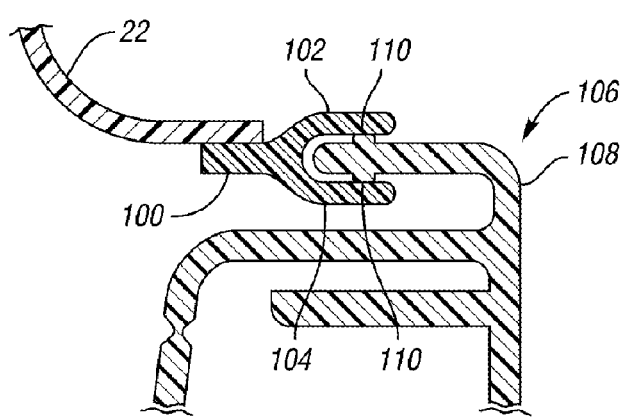

In FIG. 4F, the first coupling member 100 has first and second walls 102,104 that are adapted to engage a second coupling member 106. The first and/or second walls 102,104 may include one or more protrusions adapted to engage the second coupling member 106. The second coupling member 106 may have any suitable configuration. For example, the second coupling member 106 may extend from a surface of the housing or may extend from a connecting wall 108 extending from the housing. Optionally, the second coupling member 106 may include one or more protrusions 110 that engage the first coupling member 100.

The present invention permits a simplified manufacturing of a seat assembly. More specifically, a trim cover may be quickly and easily attached to the seat assembly without the need for additional fasteners, adhesives, or manufacturing steps. In addition, the present invention permits the trim cover to be reliably attached and repositioned or reinstalled to eliminate wrinkles or misalignment that may occur during assembly, thereby reducing scrap. In addition, the present invention permits the trim cover to be easily replaced if the trim cover is damaged or otherwise needs replacement.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly, comprising:
   a cushion assembly having a frame, a cushion associated with the frame, and a trim cover disposed proximate the cushion, the trim cover having an end portion;
   a first coupling member disposed proximate the end portion; and
   an air bag module disposed proximate the frame, the air bag module having a second coupling member adapted to engage the first coupling member to secure the trim cover to the air bag module;
   wherein the first coupling member includes a plurality of protrusions adapted to engage the second coupling member.

2. The vehicle seat assembly of claim 1 wherein the cushion assembly is a seat back.

3. The vehicle seat assembly of claim 1 wherein the first coupling member has a male configuration and the second coupling member has a female configuration.

4. The vehicle seat assembly of claim 1 wherein the first coupling member has a female configuration and the second coupling member has a male configuration.

5. The vehicle seat assembly of claim 1 wherein the end portion is at least partially disposed in the second coupling member.

6. The vehicle seat assembly of claim 1 wherein the second coupling member includes a plurality of protrusions adapted to engage the first coupling member.

7. The vehicle seat assembly of claim 1 wherein the first coupling member further comprises a protrusion disposed proximate an end surface, and the second coupling member further comprises an arm extending from the air bag module, the arm having an aperture configured to receive the protrusion.

8. A vehicle seat assembly, comprising:
a seat back including:
a frame,
a cushion disposed proximate the frame, and
a trim cover disposed proximate the cushion, the trim cover having an end portion;
an air bag module disposed proximate the frame, the air bag module having a housing that includes a slot; and
a coupling member configured to be disposed in the slot to secure the trim cover to the air bag module.

9. The vehicle seat assembly of claim 8 wherein the housing includes first and second walls disposed opposite each other and cooperating to define the slot.

10. The vehicle seat assembly of claim 9 wherein the first and second walls are connected by a connecting wall.

11. The vehicle seat assembly of claim 10 wherein the connecting and second walls are integrally formed with the first wall, and the connecting and second walls have a generally L-shaped configuration.

12. The vehicle seat assembly of claim 9 wherein the coupling member further comprises a protrusion disposed proximate an end surface, and connecting wall further comprises an aperture adapted to receive the protrusion.

13. The vehicle seat assembly of claim 9 wherein the air bag module further comprises an air bag, wherein the first wall is disposed proximate the air bag and the second wall is spaced apart from the air bag when the air bag is deflated.

14. The vehicle seat assembly of claim 9 wherein the coupling member further comprises a protrusion adapted to engage the first wall.

15. The vehicle seat assembly of claim 14 wherein the first wall further comprises an aperture adapted to receive the protrusion.

16. The vehicle seat assembly of claim 9 wherein the coupling member further comprises a protrusion adapted to engage the second wall.

17. The vehicle seat assembly of claim 16 wherein the second wall further comprises an aperture adapted to receive the protrusion.

18. The vehicle seat assembly of claim 9 wherein the end portion contacts the second wall when the coupling member is inserted into the slot.

19. A vehicle seat assembly, comprising:
a seat back having a frame, a cushion connected to the frame, and a trim cover disposed proximate the cushion, the trim cover having an end portion;
an air bag module disposed proximate the frame, the air bag module having a housing and an air bag disposed in the housing when the air bag is deflated, the housing including first and second walls, the first wall being disposed proximate the air bag and the second wall being disposed adjacent to the cushion, the first and second walls cooperating to define a slot; and
a coupling member attached to the end portion; and
wherein the coupling member is at least partially disposed in the slot and contacts the first and second walls to couple the trim cover to the air bag module.

20. The vehicle seat assembly of claim 19 wherein the first and second walls are configured to flex toward the cushion when the air bag is inflated.

* * * * *